(12) United States Patent
Yamaguchi et al.

(10) Patent No.: US 11,587,261 B2
(45) Date of Patent: Feb. 21, 2023

(54) IMAGE PROCESSING APPARATUS AND RANGING APPARATUS

(71) Applicant: KABUSHIKI KAISHA TOSHIBA, Tokyo (JP)

(72) Inventors: Jun Yamaguchi, Kawasaki Kanagawa (JP); Yusuke Moriuchi, Yokohama Kanagawa (JP); Nao Mishima, Inagi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 15/905,618

(22) Filed: Feb. 26, 2018

(65) Prior Publication Data
US 2019/0080481 A1 Mar. 14, 2019

(30) Foreign Application Priority Data
Sep. 8, 2017 (JP) .............................. JP2017173346

(51) Int. Cl.
*G06T 7/00* (2017.01)
*G06T 3/40* (2006.01)
*G06T 5/00* (2006.01)
*G06T 7/55* (2017.01)
*G01C 11/06* (2006.01)
(Continued)

(52) U.S. Cl.
CPC .................. *G06T 7/97* (2017.01); *G06T 3/40* (2013.01); *G06T 5/003* (2013.01); *G06T 5/006* (2013.01); *G06T 7/55* (2017.01); *G06T 2200/04* (2013.01)

(58) Field of Classification Search
CPC .. G06T 7/97; G06T 5/006; G06T 3/40; G06T 5/003; G06T 7/55; G06T 2200/04; G06T 2207/10004; G06T 7/514; G01C 11/06; G01B 11/14
See application file for complete search history.

(56) References Cited

U.S. PATENT DOCUMENTS 6,118,475 A 9/2000 Iijima et al.
2007/0280529 A1* 12/2007 Kaneko .................. G06T 5/009
382/154

(Continued)

FOREIGN PATENT DOCUMENTS

JP H7-77410 A 3/1995
JP 8-43055 2/1996
(Continued)

*Primary Examiner* — John W Lee
(74) *Attorney, Agent, or Firm* — Finnegan, Henderson, Farabow, Garrett & Dunner, LLP

(57) ABSTRACT

According to one embodiment, an image processing apparatus includes a buffer and processing circuitry. The buffer stores first and second images capturing an object. The circuitry calculates at least one of a first distance to the object in the first image and a second distance to the object in the second image by using a correction parameter for correcting at least one of influences caused by ambient light, a reflection characteristic of the object, or a color of the object, calculates three-dimensional coordinates of the object on a relative scale by using the first and second images, and calculates three-dimensional coordinates of the object on a real scale based on at least one of the first and second distances, and the three-dimensional coordinates of the object on the relative scale.

13 Claims, 12 Drawing Sheets

(51) Int. Cl.
*G06T 7/514* (2017.01)
*G01B 11/14* (2006.01)

(56) References Cited

U.S. PATENT DOCUMENTS

| | | | | |
|---|---|---|---|---|
| 2011/0304753 | A1* | 12/2011 | Shintani | H04N 9/04555 |
| | | | | 348/E9.002 |
| 2013/0286164 | A1* | 10/2013 | Kim | G06T 7/529 |
| | | | | 382/154 |
| 2014/0140579 | A1* | 5/2014 | Takemoto | G06T 7/593 |
| | | | | 382/106 |
| 2015/0201124 | A1* | 7/2015 | Litvak | H04N 5/23219 |
| | | | | 348/77 |
| 2015/0206023 | A1* | 7/2015 | Kochi | G01B 11/00 |
| | | | | 382/199 |
| 2016/0154152 | A1 | 6/2016 | Moriuchi et al. | |
| 2017/0054910 | A1 | 2/2017 | Moriuchi et al. | |
| 2017/0353710 | A1 | 12/2017 | Sasaki et al. | |
| 2018/0136477 | A1 | 5/2018 | Moriuchi et al. | |
| 2018/0137607 | A1 | 5/2018 | Mishma et al. | |
| 2018/0137629 | A1 | 5/2018 | Mishma et al. | |
| 2018/0137638 | A1 | 5/2018 | Taguchi et al. | |
| 2018/0139378 | A1 | 5/2018 | Moriuchi et al. | |
| 2018/0268225 | A1 | 9/2018 | Sakashita et al. | |
| 2018/0270413 | A1 | 9/2018 | Sakashita et al. | |
| 2018/0275659 | A1 | 9/2018 | Ono et al. | |
| 2018/0365849 | A1 | 12/2018 | Taguchi et al. | |
| 2019/0007670 | A1 | 1/2019 | Sakurai et al. | |
| 2019/0014262 | A1 | 1/2019 | Yamaguchi et al. | |

FOREIGN PATENT DOCUMENTS

| | | |
|---|---|---|
| JP | 2016-102733 | 6/2016 |
| JP | 2017-40642 | 2/2017 |
| JP | 2017-220760 | 12/2017 |
| JP | 2018-77190 A | 5/2018 |
| JP | 2018-78514 A | 5/2018 |
| JP | 2018-84571 A | 5/2018 |
| JP | 2019-4424 A | 1/2019 |
| JP | 2019-11971 A | 1/2019 |
| JP | 2019-15575 A | 1/2019 |

* cited by examiner

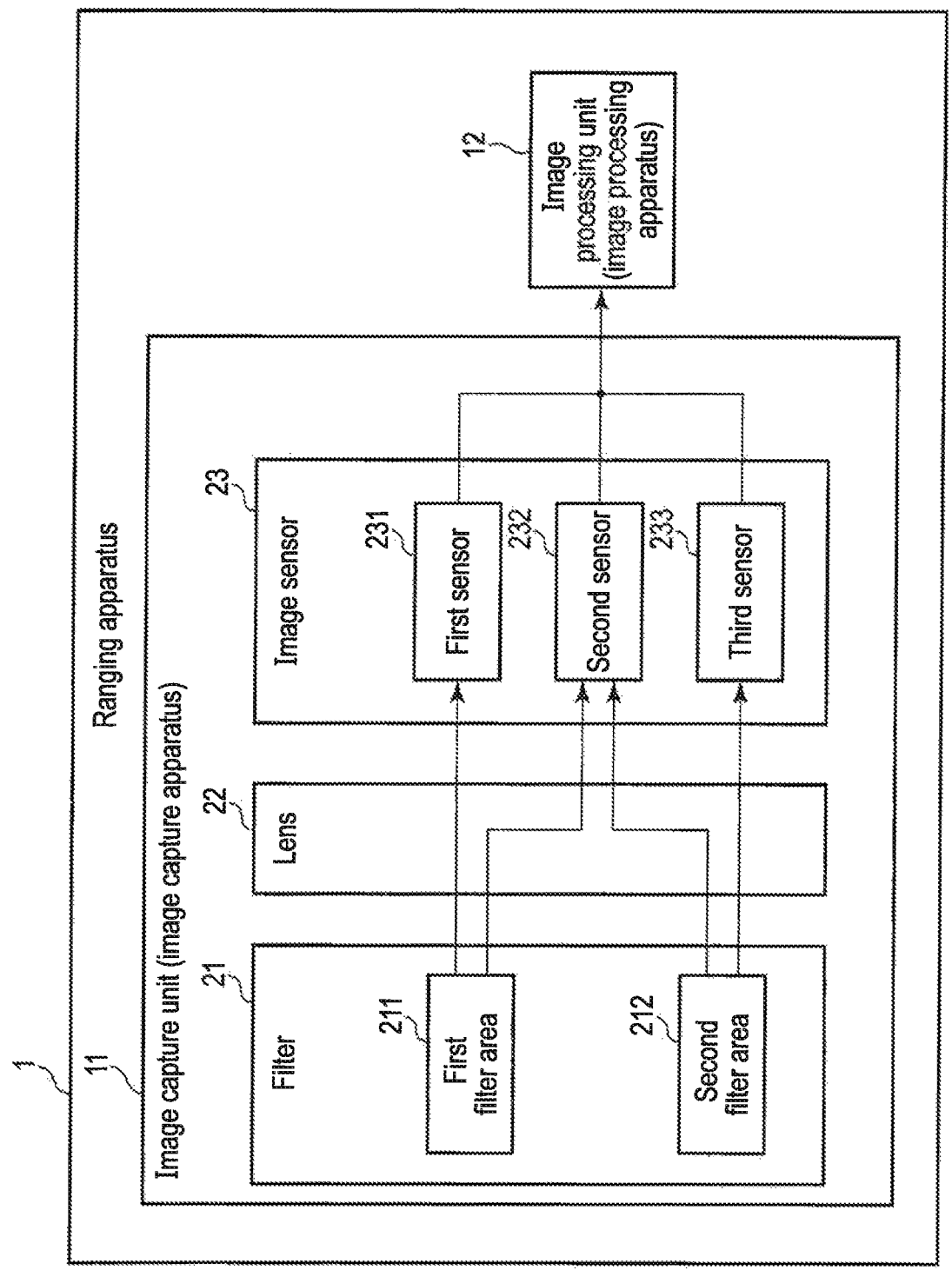
F I G. 1

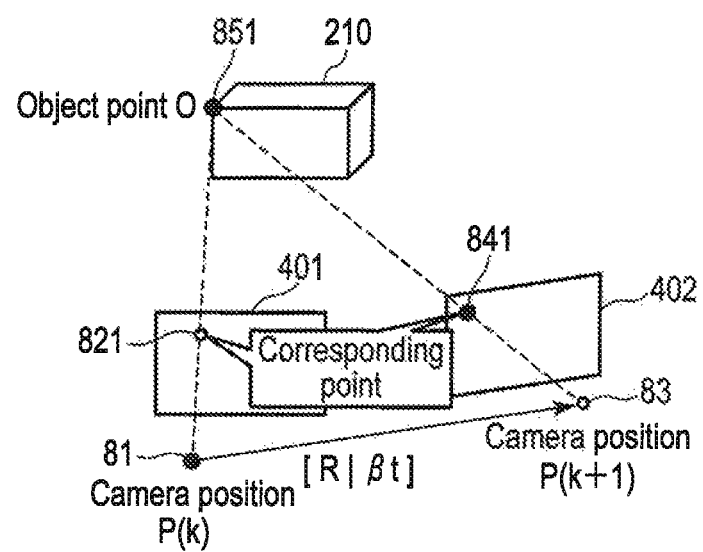
F I G. 10

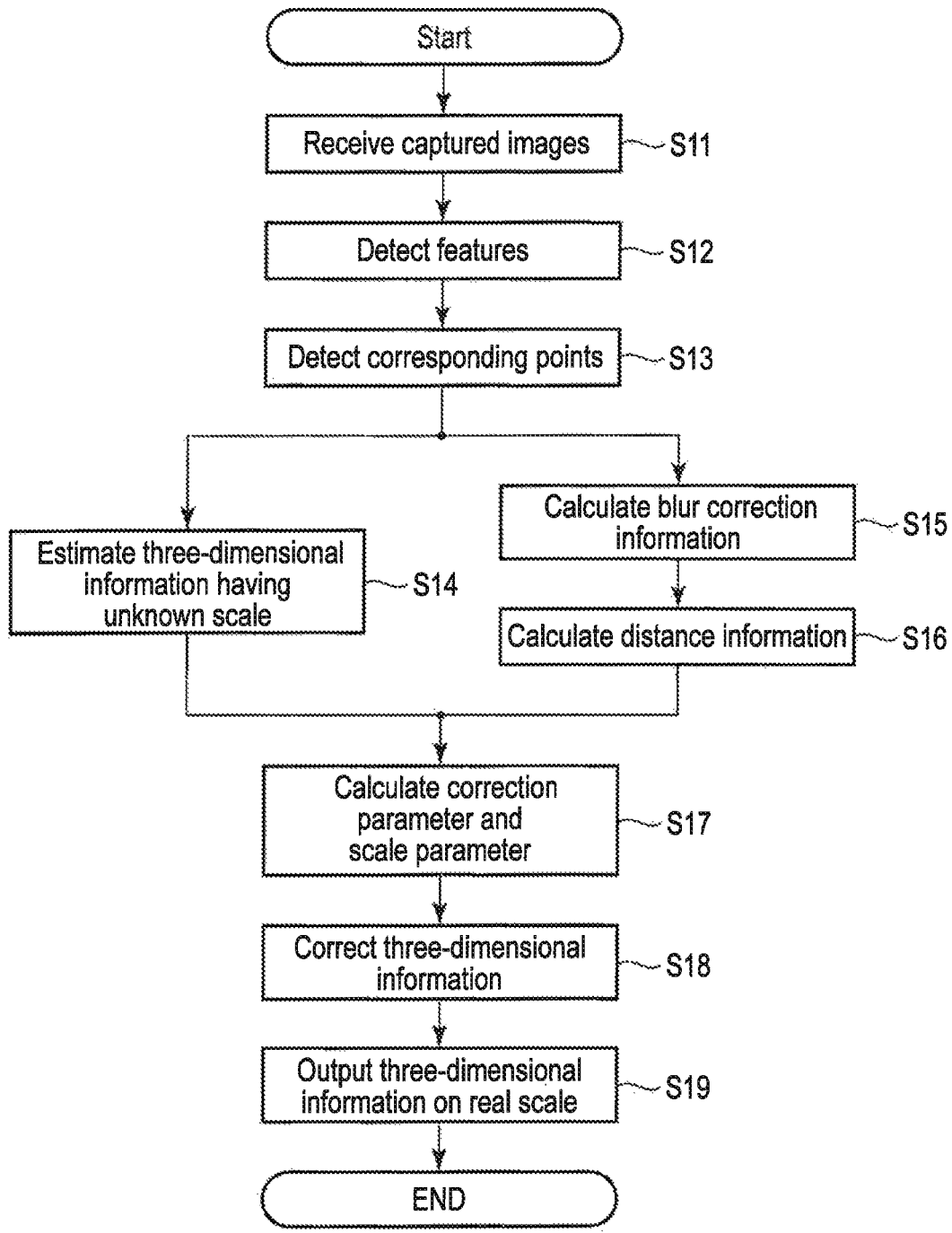
F I G. 11

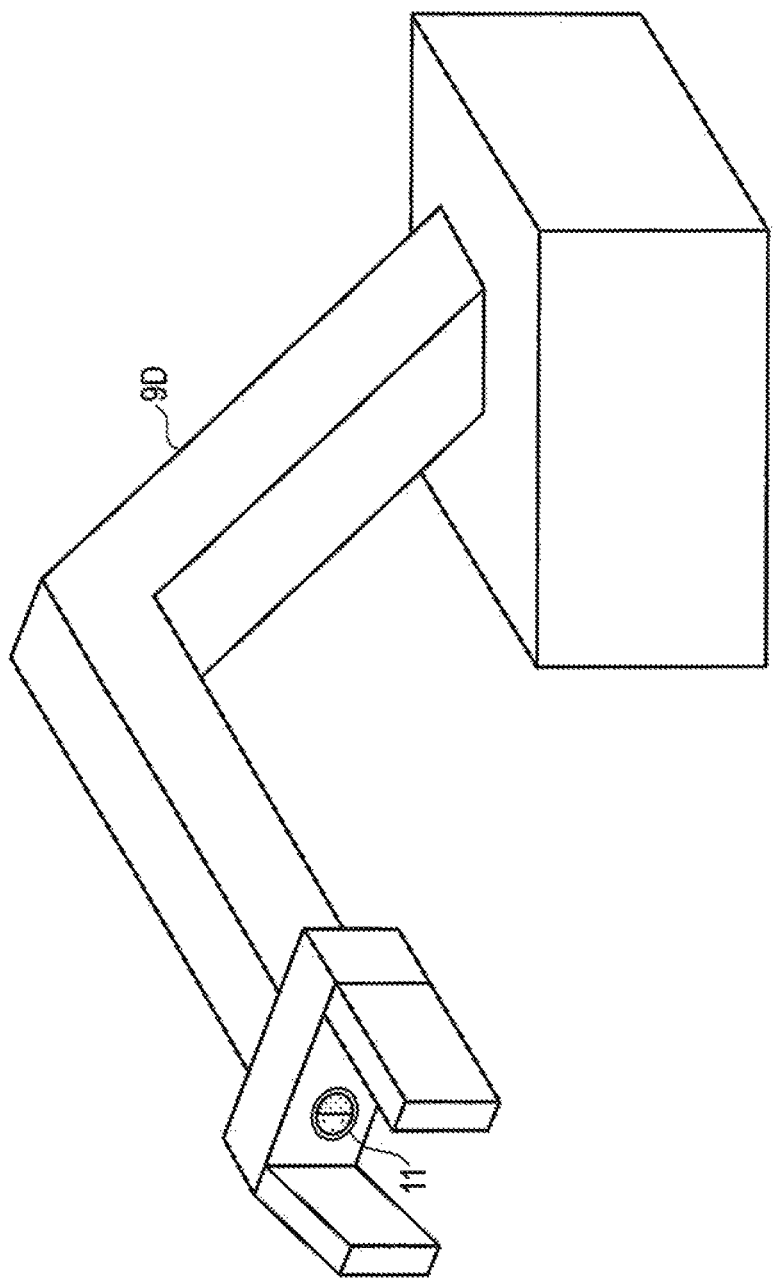

IMAGE PROCESSING APPARATUS AND RANGING APPARATUS

CROSS-REFERENCE TO RELATED APPLICATIONS

This application is based upon and claims the benefit of priority from Japanese Patent Application No. 2017-173346, filed Sep. 8, 2017, the entire contents of which are incorporated herein by reference.

FIELD

Embodiments described herein relate generally to an image processing apparatus and a ranging apparatus.

BACKGROUND

A technique for obtaining a distance to an object from images captured by two cameras or a stereo camera (binocular camera) is known. Furthermore, there is a technique recently proposed to obtain a distance to an object from images captured by one camera (monocular camera).

The captured images may be affected by ambient light or a reflection characteristic of the object. Obtaining the distance to the object with such images may decrease accuracy.

BRIEF DESCRIPTION OF THE DRAWINGS

FIG. 1 is an exemplary block diagram illustrating a structure of a ranging apparatus according to an embodiment;

FIG. 10 is a view describing an example in which the position of the object is estimated by the image processing unit in FIG. 8;

FIG. 11 is a flowchart illustrating an example of the procedure of a process executed by the image processing unit in FIG. 8;

FIG. 16 is a perspective view illustrating an exemplary external appearance of a robot arm including the ranging apparatus of the embodiment.

DETAILED DESCRIPTION

Figure 2:
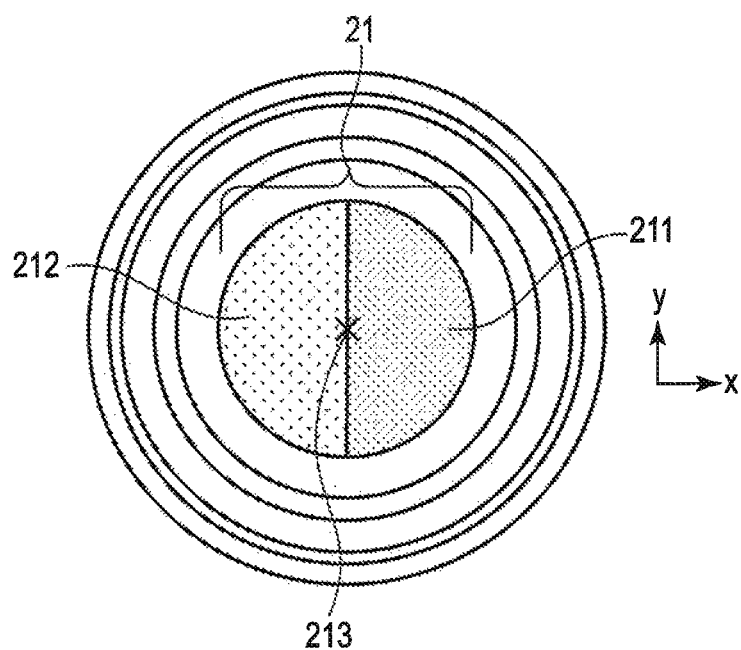
FIG. 2 is a view illustrating an exemplary structure of a filter disposed in an image capture unit in the ranging apparatus of the embodiment.
Figure 3:
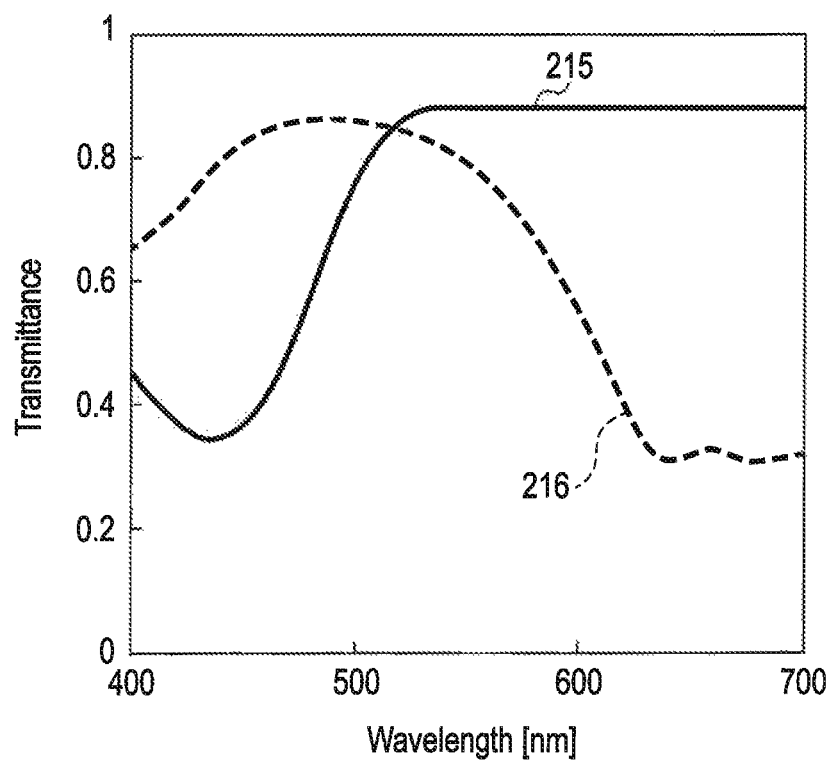
FIG. 3 is a view illustrating exemplary transmittance characteristics of the filter in FIG. 2.

In general, according to one embodiment, an image processing apparatus includes a buffer and processing circuitry. The buffer is configured to store a first image capturing an object and a second image capturing the object, the first image different from the second image. The processing circuitry is configured to: calculate at least one of a first distance to the object in the first image and a second distance to the object in the second image by using a correction parameter for correcting at least one of influences caused by ambient light, a reflection characteristic of the object, or a color of the object; calculate three-dimensional coordinates of the object on a relative scale by using the first image and the second image; and calculate three-dimensional coordinates of the object on a real scale based on at least one of the first distance and the second distance and based on the three-dimensional coordinates of the object on the relative scale.

Various embodiments will be described hereinafter with reference to the accompanying drawings.

First, a structure of a ranging apparatus according to an embodiment will be described with reference to FIG. 1. A ranging apparatus 1 captures an image, and estimates a position of an object on the real scale (full scale) by using the captured image. The estimated position of the object includes at least a distance (also referred to as a depth) from a position of the ranging apparatus 1 to the object. The estimated position of the object is represented, for example, by coordinates in a three-dimensional space.

The ranging apparatus 1 includes an image capture unit 11 that captures an image and an image processing unit 12 that processes the captured image. The ranging apparatus 1 may be realized as an apparatus provided with the image capture unit 11 and the image processing unit 12, or may be realized as a system including multiple devices such as an image capture apparatus corresponding to the image capture unit 11 and an image processing apparatus corresponding to the image processing unit 12. The image capture unit 11 has a function of obtaining an image of an object and information relating to a distance to the object by one shot. With this function, for example, the image capture unit 11 obtains an image in which distance information to the object at the time of capturing is encoded. The image processing unit 12 can be realized as, for example, a computer or an embedded system incorporated in various electronic devices. The image processing unit 12 has a function of generating three-dimensional information of the object by using at least two images captured by the image capture unit 11.

As illustrated in FIG. 1, the image capture unit 11 includes a monocular camera provided with a filter 21, a lens 22 and an image sensor 23. The filter 21 includes filter areas that transmit light rays having different wavelength hands (color components). The filter 21 includes, for example, filter areas of two colors: a first filter area 211 and a second filter area 212. The image capture unit 11 generates at least two images obtained by capturing the object at least from different positions and viewpoints. Therefore, the object differs in vision between the two images.

The image sensor 23 receives the light rays penetrating the filter 21 and the lens 22, and converts the received light rays into electrical signals (photoelectric conversion). Examples of the image sensor 23 include a charge coupled device (CCD), and a complementary metal oxide semiconductor (CMOS). The image sensor 23 includes at least two kinds of imaging elements and is provided with, for example, a first sensor 231 including imaging elements that receive red (R) light rays, a second sensor 232 including imaging elements that receive green (G) light rays, and a third sensor 233 including imaging elements that receive blue (B) light rays. Each imaging element receives light rays having a corresponding wavelength band, and converts the received light ray into electrical signals. The electrical signals are converted by A/D conversion so as to generate a color image. Hereinafter, color component images (also referred to as wavelength component images) which are images of an R component, a G component, and a B component are also referred to as an R image, a G image, and a B image, respectively. It should be noted that the R, G, and B images can also be generated with the electrical signals for each of the red, green, and blue imaging elements. In other words, the image capture unit 11 can generate at least one of the color images: the R, G, and B images, by one-time capturing (one shot).

Next, FIG. 2 illustrates an exemplary structure of the filter 21. The filter 21 has the filter areas that transmit light rays having different wavelength bands (color components), and two or more filter areas are point-asymmetric with respect to an optical center 213 of an image capture apparatus 2. The filter 21 includes, for example, filter areas of two colors: the first filter area 211 and the second filter area 212. The center of the filter 21 corresponds to the optical center 213 of the image capture apparatus 2 (lens 22). Each of the first filter area 211 and the second filter area 212 has a shape point-asymmetric with respect to the optical center 213. For example, the two filter areas 211 and 212 do not overlap, and the two filter areas 211 and 212 constitute the entire area of the filter 21. In the example illustrated in FIG. 2, each of the first filter area 211 and the second filter area 212 has a semicircular shape formed by dividing the circular filter 21 by a line through the optical center 213. For example, the first filter area 211 is a yellow (Y) filter area, and the second filter area 212 is a cyan (C) filter area. It should be noted that the first filter area 211 may be a magenta (M) filter area, and the second filter area 212 may be a yellow (Y) filter area. Furthermore, the first filter area 211 may be a cyan (C) filter area, and the second filter area 212 may be a magenta (M) filter area.

Those color filters transmit different wavelength bands. A part of a wavelength band of light rays that penetrates one filter area may have, for example, an overlap with a part of a wavelength band of light rays that penetrates another color filter area. A wavelength band of light rays that penetrates one color filter area may include, for example, a wavelength band of light rays that penetrates another color filter area.

It should be noted that each of the first filter area 211 and the second filter area 212 may be a filter that changes transmittance of any wavelength bands, or a polarized filter that allows light rays polarized in any directions to pass therethrough. Alternatively, each filter area may be a microlens that changes light-condensing power of any wavelength bands. The filter that changes transmittance of any wavelength bands may be, for example, a primary color filter (RGB), a complementary color filter (CMY), a color correction filter (CC-RGB/CMY), an infrared/ultraviolet cut filter, an ND filter, or a masking shield. In a case where the first filter area 211 and the second filter area 212 are microlenses, the lens 22 brings about biasing distribution of condensed light rays, which changes blur shapes.

For sake of simplicity, hereinafter mainly illustrated is a case where the first filter area 211 is a yellow (Y) filter area and the second filter area 212 is a cyan (C) filter area in the filter 21 illustrated in FIG. 2.

For example, the filter 21 illustrated in FIG. 2 being provided to an aperture of the camera configures a color aperture having a structure in which the aperture is divided into halves by two colors. Based on light rays that penetrate the color aperture, the image sensor 23 generates an image. The lens 22 may be disposed between the filter 21 and the image sensor 23 on an optical path of the light rays incident upon the image sensor 23. The filter 21 may be disposed between the lens 22 and the image sensor 23 on the optical path of the light rays incident upon the image sensor 23. In a case where lenses 22 are provided, the filter 21 may be disposed between two lenses 22.

Light rays having a wavelength band corresponding to the second sensor 232 penetrate both the first filter area 211 of yellow color and the second filter area 212 of cyan color. Light rays having a wavelength band corresponding to the first sensor 231 penetrate the first filter area 211 of yellow color and do not penetrate the second filter area 212 of cyan color. Light rays having a wavelength band corresponding to the third sensor 233 penetrate the second filter area 212 of cyan color and do not penetrate the first filter area 211 of yellow color.

The fact that light rays having a certain wavelength band penetrate a filter or a filter area represents that the filter or the filter area transmits the light rays having the wavelength band with high transmittance, and the fact represents that attenuation of the light rays having the wavelength band due to the filter or the filter area (a decrease in light intensity) is extremely small. Furthermore, the fact that light rays having a certain wavelength band do not penetrate a filter or a filter area represents that the light rays are shielded by the filter or the filter area: for example, the filter or the filter area transmits the light rays having the wavelength hand with low transmittance, and the fact represents that attenuation of the light rays having the wavelength band due to the filter or the filter area is extremely large. For example, a filter or a filter area absorbs light rays having a certain wavelength band so as to attenuate the light rays.

Figure 5:
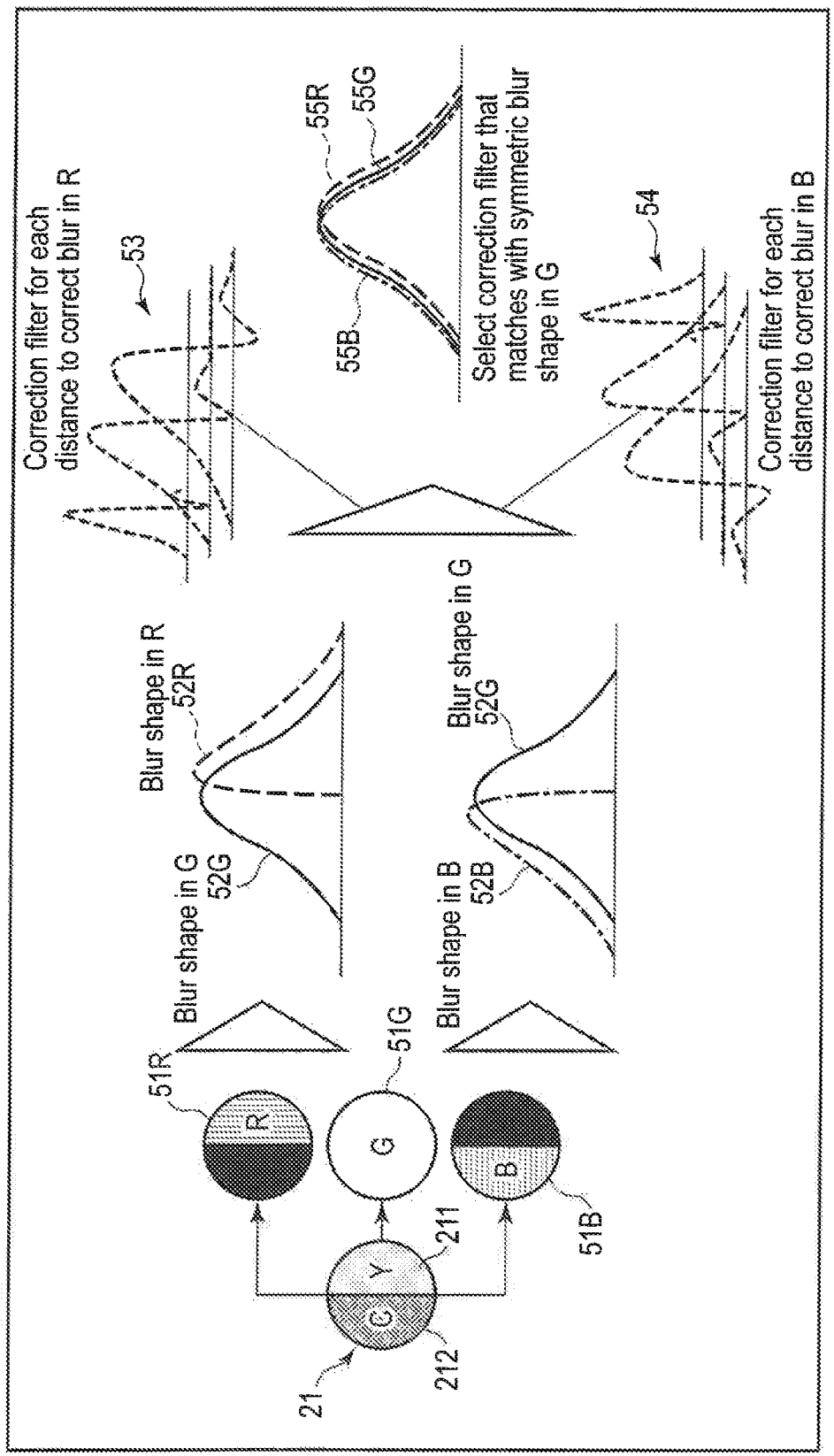
FIG. 5 is a view describing an exemplary method for calculating a distance to an object, using blurs on images captured by the ranging apparatus of the embodiment.

FIG. 5 illustrates exemplary transmittance characteristics of the first filter area 211 and the second filter area 212. Although transmittance with respect to light rays having a wavelength band longer than 700 nm in wavelength bands of visible light is not illustrated, it should be noted that the transmittance is close to transmittance with respect to a wavelength band of 700 nm. In a transmittance characteristic 215 of the first filter area 211 of yellow color illustrated in FIG. 5, light rays having wavelength bands from about 620 nm to 750 nm corresponding to the R image and light rays having wavelength bands from about 495 nm to 570 nm corresponding to the G image are transmitted with high transmittance, and light rays having wavelength bands from about 450 nm to 495 nm corresponding to the B image are hardly transmitted. In a transmittance characteristic 216 of the second filter area 212 of cyan color, the light rays having the wavelength bands corresponding to the B image and the light rays having the wavelength bands corresponding to the G image are transmitted with high transmittance, and the light rays having the wavelength bands corresponding to the R image are hardly transmitted.

Therefore, the light rats having the wavelength bands corresponding to the R image (the first sensor 231) penetrate the first filter area 211 of yellow color, and the light rays having the wavelength hands corresponding to the B image (the third sensor 233) penetrate the second filter area 212 of cyan color. The light rays having the wavelength bands corresponding to the G image (the second sensor 232) penetrate the first filter area 211 and the second filter area 212.

These R and B images and blur shapes on the images change in accordance with a distance d to an object, more specifically, in accordance with a difference between the distance d and a focusing distance df. The focusing distance df is a distance from an image-capturing position to a focused position where an image is not blurred (that is, a position in focus). The filter areas 211 and 212 have a shape point-asymmetric with respect to the optical center 213 so that the blur shapes on the R and B images differ and slant depending on situations whether the object is on the near side or on the deep side from the focusing distance df. Directions of the slant in the blurs on the R and B images reverse depending on the situations whether the object is on the near side or the deep side from the focusing distance df as seen from the image-capturing position.

Figure 4:
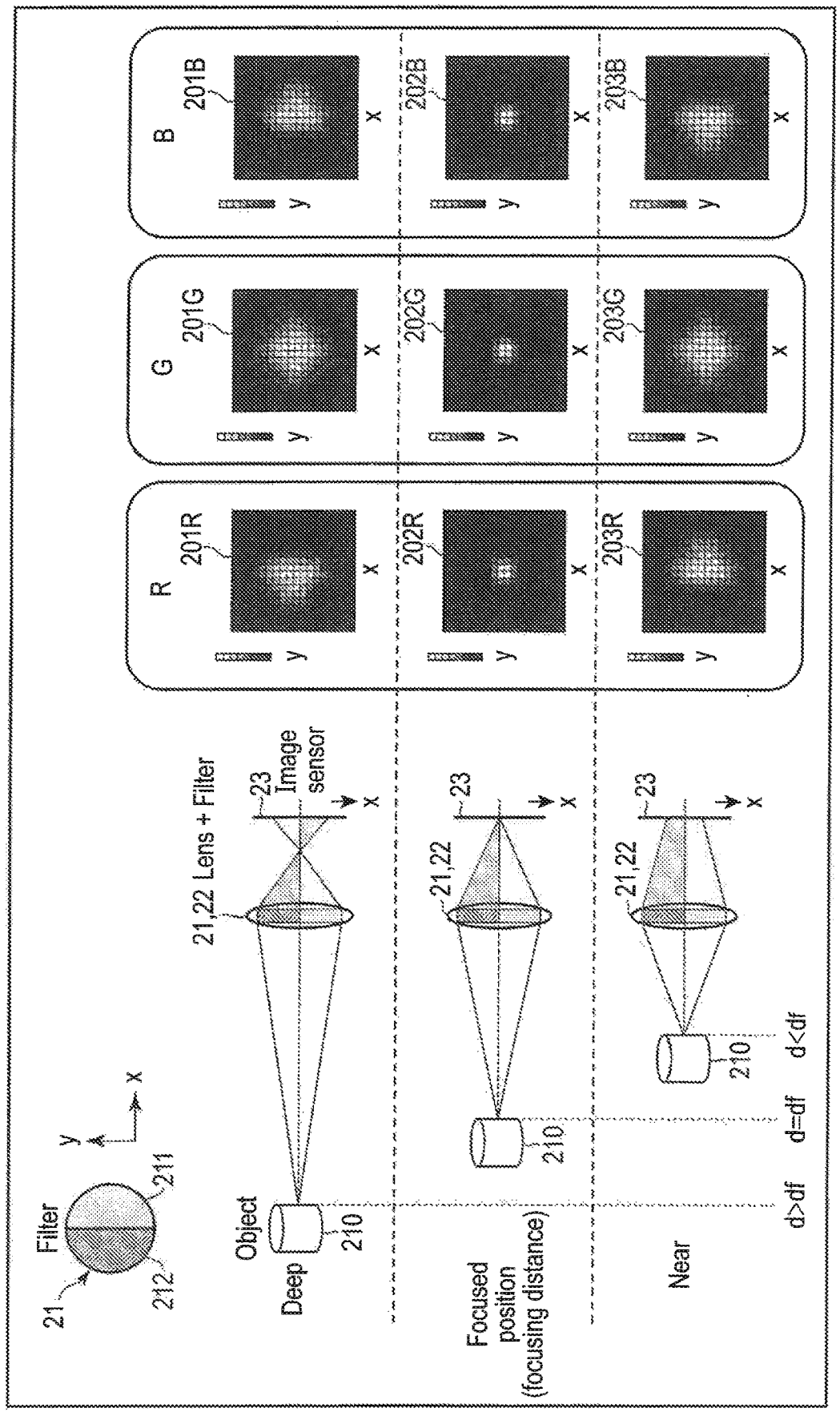
FIG. 4 is a view describing changes in light rays and blur shapes due to a color aperture provided with the filter in FIG. 2.

With reference to FIG. 4, hereinafter described are changes in light rays and blur shapes due to the color aperture provided with the filter 21.

In a case where an object 210 is on the deep side from the focusing distance di (d>df), images captured by the image sensor 23 are blurred. Blur functions (point spread functions: PSI) indicating blur shapes on the images differ between the R, G, and B images. For example, a blur function 201R of the R image indicates a blur shape slanted to the left, a blur function 201G of the G image indicates a balanced blur shape, and a blur function 201B of the B image indicates a blur shape slanted to the right.

When the object 210 is at the focusing distance df (d=df), images captured by the image sensor 23 are hardly blurred. Blur functions indicating blur shapes on the images are substantially similar between the R, G, and B images. In other words, a blur function 202R of the R image, a blur function 202G of the G image, and a blur function 202B of the B image indicate balanced blur shapes.

When the object 210 is on the near side from the focusing distance df (d<df), images captured by the image sensor 23 are blurred. Blur functions indicating blur shapes on the images differ between the R, G, and B images. In other words, a blur function 203R of the R image indicates a blur shape slanted to the right, a blur function 203G of the G image indicates a balanced blur shape, and a blur function 203B of the B image indicates a blur shape slanted to the left.

In this manner, when the object 210 is on the near side or on the deep side from the focusing distance df, the blur function 201R and the blur function 203R of the R image based on the light rays penetrating the first filter area 211 of yellow color are asymmetric, and the blur function 201B and the blur function 203B of the B image based on the light rays penetrating the second filter area 212 of cyan color are also asymmetric. The blur function 201R and the blur function 203R of the R image differ from the blur function 201B and the blur function 203B of the B image, respectively.

FIG. 5 illustrates a method for calculating (estimating) a distance to the object 210, using such blurs on the images. In the example illustrated in FIG. 5, the filter 21 includes the first filter area 211 of yellow color and the second filter area 212 of cyan color. Therefore, the light rays having the wavelength bands corresponding to the R image penetrate a portion 51R corresponding to the first filter area 211, the light rays having the wavelength bands corresponding to the G image penetrate a portion 51G corresponding to the first filter area 211 and the second filter area 212, and the light rays having the wavelength bands corresponding to the B image penetrate a portion 51B corresponding to the second filter area 212.

When images captured with such a filter 21 are blurred, blur shapes differ between the R, G, and B images. As illustrated in FIG. 5, a blur function 52G of the G image indicates a bilaterally symmetric blur shape. A blur function 52R of the R image and a blur function 52B of the B image indicate point-asymmetric blur shapes, but the blurs slant differently.

Blur correction filters 53 and 54 are applied to the blur function 52R of the R image and the blur function 52B of the B image, respectively so as to correct point-asymmetric blurs on the R image and the B image to a bilaterally symmetric blur. Then, it is determined whether the blur function 52R and the blur function 52B after application of the blur correction filter 53 and 54 match the blur function 52G of the G image. Blur correction filters 53 and 54 are prepared, and the blur correction filters 53 and 54 correspond to distances between the object. When a blur function to which one of the blur correction filters 53 and 54 is applied matches the blur function 520 of the G image, a distance corresponding to the one of the blur correction filters 53 and 54 is determined as a distance to the shot object 210.

In determining whether a blur function matches the blur function 52G, for example, what is used is a correlation between the G image and the R image or B image to which a certain blur correction filter is applied. Therefore, for example, searching a blur correction filter, for which a correlation between the R image or B image to which the blur correction filter is applied and the G image is higher, from among the blur correction filters achieves estimating the distance to the object captured in each pixel on the image.

In regard to a correlation value indicating the correlation between the G image and the R image or B image to which a certain blur correction filter is applied, for example, Normalized Cross-Correlation (NCC), Zero-mean Normalized Cross-Correlation (ZNCC), Color Alignment Measure, or the like may be used.

Furthermore, in determining whether blur functions 55R or 556 to which a certain blur correction filter 53 or 54 is applied match the blur function 52G of the C image, the following difference may also be used: a difference between the G image and the A image or B image to which a certain blur correction filter is applied. Obtaining a distance having lower difference enables calculation of the distance to the object. As for the difference, for example, Sum of Squared Difference (SSD), Sum of Absolute Difference (SAD) or the like may be used.

It should be noted that a blur function of the R image to which the blur correction filter 53 is applied may be determined whether it matches a blur function of the B image to which the blur correction filter 54 is applied. These blur correction filters 53 and 54 correspond to the same distance. When the blur function of the R image to which the blur correction filter 53 is applied matches the blur function of the B image to which the blur correction filter 54 is applied, a distance corresponding to those blur correction filters 53 and 54 is determined as the distance to the shot object 210.

In this manner, a relative relationship of the blurs (for example, blur functions or blur shapes) on the two color component images has a correlation with the distance to the object so that the image processing unit 12 can calibrate the correlation in advance and hold the same. A look-up table (LUT) or a model is prepared by calibration. The LUT or the model herein indicates correspondence between a distance to an object and a blur correction amount for correcting a blur on one color component image to a blur on another color component image. For example, prepared is an LUT or a model indicating correspondence between the distance to the object and the blur correction filters 53, 54 used to match the blur function of the R image or B image and the blur function of the G image.

Instead of the blur correction amount, other values (parameters) such as magnitude of blurs indicating a relationship between a blur on one color component image and a blur on another color component image may be used. By referring to this LUT or model, it is possible to convert the blur correction amount into the distance to the object.

However, in the method for estimating a distance to an object based on blurs on images, an estimation accuracy of a distance may decrease due to at least one of influences caused by ambient light at the time of capturing, a reflection characteristic of the object, or a color of the object. An influence caused by the ambient light results from, for example, a difference in spectral characteristics of a light source due to capturing in various environments such as outdoors and indoors. An influence caused by the reflection characteristic of the object results from, for example, a difference in reflectance spectral characteristics due to a material of the object and unevenness in an object surface.

More specifically, in a case where a transmittance characteristic of the filter 21 and a spectral sensitivity characteristic of the image sensor 23 do not have an ideal frequency-response characteristic for this estimation method, the influences of the ambient light, the reflection characteristic of the object, and the color of the object vary the blurs on the images (amount and shape of the blurs) even between the same distances to the object. Such variations in the blurs decrease the estimation accuracy of the distance to the object estimated based on the blurs on the images. For example, the relative relationship of the blurs on the two color component images does not necessarily correspond one-to-one with the distance to the object even between the same distances to the object in actuality. Therefore, calculating the distance based on the correlation calibrated in advance may vary distances to be calculated. Accordingly, it is obtaining a distance to an object from images with high accuracy.

The ideal frequency-response characteristic is obtained by, for example, a combination of the spectral sensitivity characteristic of the image sensor 23 and the transmittance characteristic of the filter 21 which allows light rays having a wavelength band received by the third sensor 233 (blue sensor) to pass through the second filter area 212 (for example, cyan) and which shields the light rays in the first filter area 211 (for example, yellow). In this embodiment, even when using a camera without such an ideal characteristic, a distance to an object and three-dimensional coordinates of the object are estimated robustly with respect to ambient light, a reflection characteristic and a color of the object.

Specifically, by a hybrid method of the method for estimating a distance to an object based on blurs on images and Structure from. Motion (SfM), what is obtained in this embodiment is a distance (three-dimensional information) in which at least one of influences caused by ambient light at the time of capturing, a reflection characteristic of the object, or a color of the object is corrected. The SfM is a three-dimensional reconstruction method for calculating a relative relationship between camera positions at the time of capturing and calculating three-dimensional information of an object, by using images obtained by capturing the object at least at different positions or different viewpoints.

Figure 6:
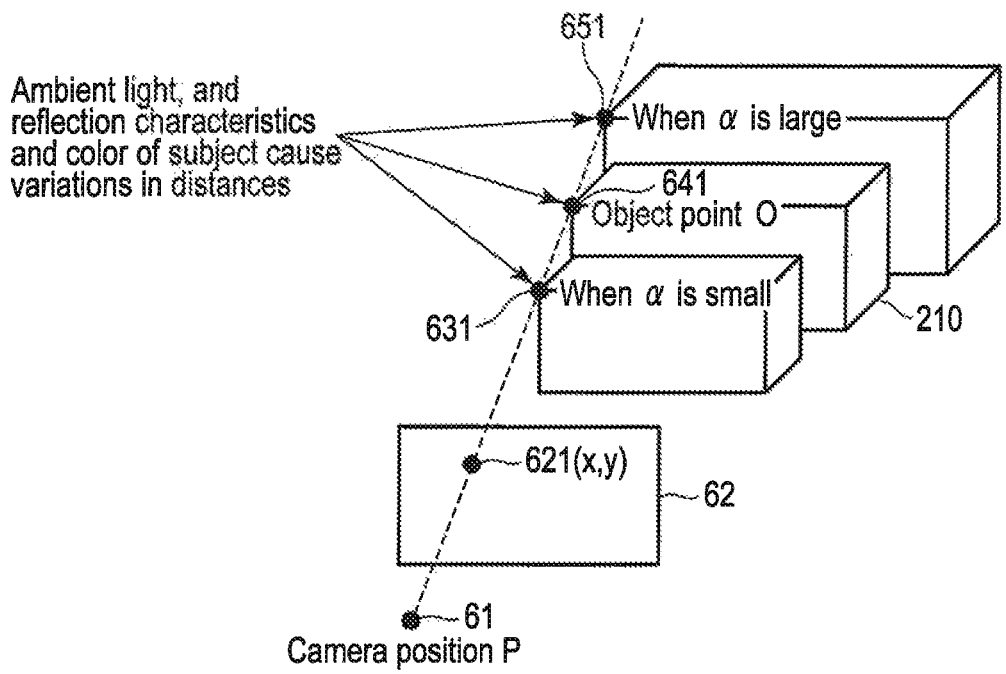
FIG. 6 is a view describing an example in which accuracy of the distance to the object estimated from the images decreases due to influences caused by ambient light and a reflection characteristic of the object surface.

Furthermore, in this embodiment, a to-be-estimated distance is determined, using not only blurs on images but also a correction parameter $\alpha$ (a correction amount) Or correcting at least one of influences caused by the ambient light at the time of capturing, the reflection characteristic of the object, or the color of the object. As illustrated in FIG. 6, in the method for estimating a distance based on blurs on images, a difference in at least one of influences caused by the ambient light, the reflection characteristic of the object, or the color of the object causes variation in calculated distances even between the same distances to the object in actuality. An image 62 is generated by capturing the object 210 from a camera position 61.

In a case where the image 62 is captured under an ideal condition, for example, a case where the image 62 is not affected by at least one of the ambient light, the reflection characteristic of the object, and the color of the object, the image processing unit 12 can accurately calculate a distance from the camera position 61 to an actual object point 641 on the object 210 corresponding to a pixel 621 based on a blur correction amount relative to the pixel 621 on the image 62. In this case, there is no need to correct the distance with the correction parameter $\alpha$.

In a case where the image 62 is not captured under an ideal condition: for example, a case where the image 62 is affected by at least one of the ambient light, the reflection characteristic of the object, and the color of the object, it is required to correct the distance estimated based on the blur correction amount relative to the pixel 621 on the image 62, using the correction parameter $\alpha$. In a case where the correction parameter $\alpha$ is smaller than a value appropriate for correction, a distance from the camera position 61 to a point 631 is calculated as the distance to the object 210 so that a distance shorter than the actual distance is calculated. In a case where the correction parameter $\alpha$ is larger than the value appropriate for correction, a distance from the camera position 61 to a point 651 is calculated as the distance to the object 210 so that a distance longer than the actual distance is calculated. In this manner, at least one of influences caused by the ambient light, the reflection characteristic of the object, and the color of the object causes variation in distances that are to be calculated as the same distance.

Figure 7:
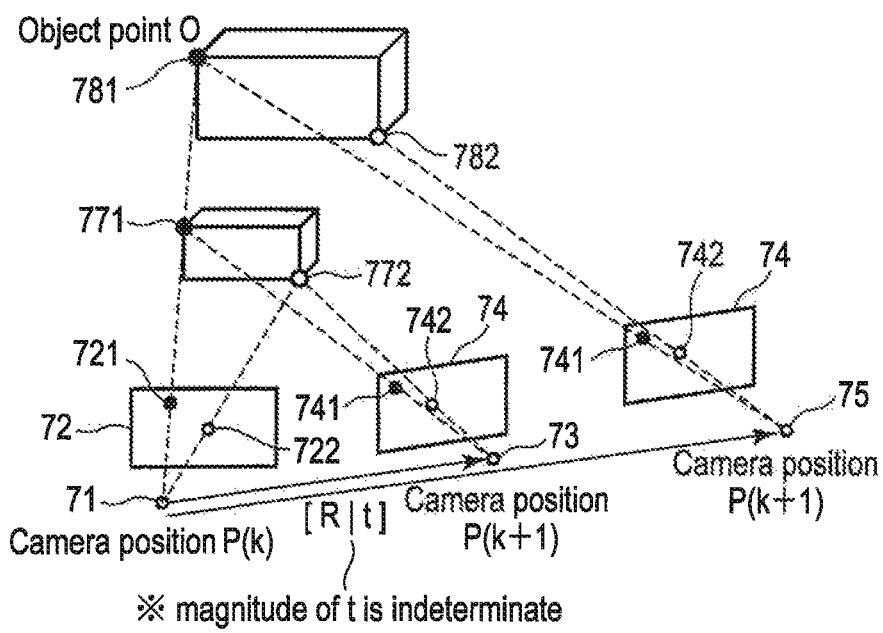
FIG. 7 is a view describing indetermination of a scale of a position of an object estimated with images captured from different positions (viewpoints)

On the other hand, in the SfM, three-dimensional information of an object having an indeterminate (unknown) scale parameter $\beta$ (scale correction amount) is obtained from images capturing the object. In other words, three-dimensional coordinates of the object herein are three-dimensional coordinates on a relative scale. FIG. 7 illustrates an example in which three-dimensional coordinates of an object having an indeterminate scale parameter $\beta$ is calculated from two images 72 and 74 obtained by capturing the object 210 at least at different positions or different viewpoints.

Since a feature 721 on the image 72 and a feature 741 on the image 74 have a corresponding feature amount, those features are a corresponding point at which a single part of the object is captured. Furthermore, since a feature 722 on the image 72 and a feature 742 on the image 74 have a corresponding feature amount, those features are a corresponding point at which another single part of the object is captured. In the SfM using these corresponding points, the image processing unit 12 estimates the relative relationship between camera positions at the time of capturing, which is represented by, for example, a rotation matrix R and a translation vector t, and estimates three-dimensional coordinates of the object corresponding to each corresponding point. The translation vector t represents a distance between cameras, having indeterminate magnitude.

Since the magnitude of the translation vector t is indeterminate, it is difficult to determine whether a camera position P(k+1) at the time of capturing the image 74 is a position 73 or a position 75 with respect to a camera position P(k) 71 at the time of capturing the image 72. Therefore, in regard to the three-dimensional coordinates of the object that corresponds to the corresponding point including the feature 721 and the feature 741, it is difficult to determine whether the three-dimensional coordinates corresponds to a point 771 in a case where the camera position P(k+1) indicates the camera position 73 or a point 781 in a case where the camera position P(k+1) indicates the camera position 75. Furthermore, in regard to the three-dimensional coordinates of the object that corresponds to the corresponding point including the feature 722 and the feature 742, it is difficult to determine whether the three-dimensional coordinates corresponds to a point 772 in a case where the camera position P(k+1) indicates the camera position 73 or a point 782 in a case where the camera position P(k+1) indicates the camera position 75.

In such manners, in the SfM, it is possible to obtain the three-dimensional coordinates of the object having the indeterminate scale parameter $\beta$. In other words, with the scale parameter $\beta$ for conversion to the real scale, it is possible to obtain three-dimensional coordinates of the object on the real scale.

Accordingly, in this embodiment, the image processing unit 12 optimizes the correction parameter $\alpha$ and the scale parameter $\beta$ so that the distance including the correction parameter $\alpha$ and the three-dimensional coordinates having the indeterminate scale parameter $\beta$ correspond to the same position in a real space, thereby calculating the three-dimensional coordinates on the real scale with improved accuracy, or calculating the distance to the object with improved accuracy. Therefore, the image processing unit 12 can calculate the three-dimensional coordinates on the real scale or the distance to the object accurately and robustly with respect to at least one of influences caused by the ambient light at the time of capturing, the reflection characteristic of the object, or the color of the object.

Figure 8:
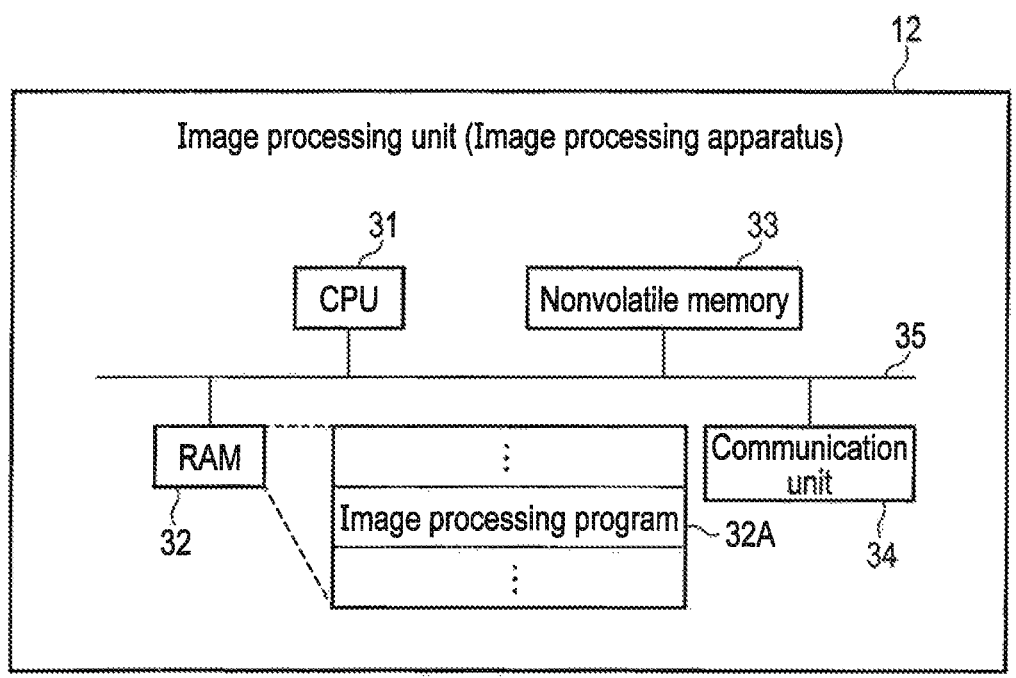
FIG. 8 is a block diagram illustrating an exemplary system structure of an image processing unit (image processing apparatus) in the ranging apparatus of the embodiment.
Figure 9:
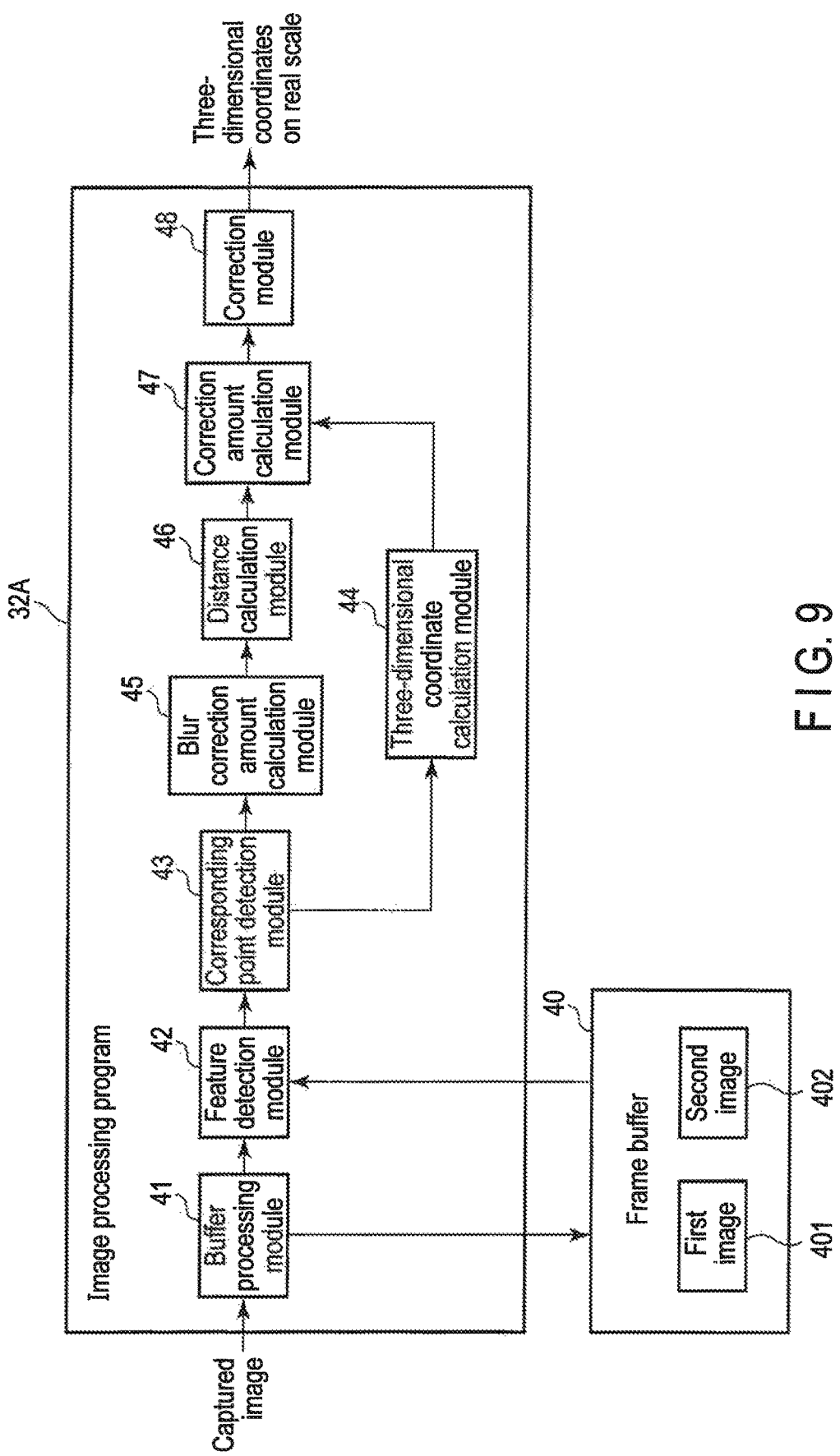
FIG. 9 is a block diagram illustrating an exemplary functional configuration of an image processing program executed by the image processing unit in FIG. 8.

With reference to FIG. 8 and FIG. 9, hereinafter described is a structure to perform the aforementioned operation.

First, FIG. 8 illustrates a system structure of the image processing unit (image processing apparatus) 12. The image processing unit 12 includes a CPU 31, a RAM 32, a nonvolatile memory 33, and a communication unit 34. The image processing unit 12 also includes a bus 35 that mutually connects the CPU 31, RAN 32, nonvolatile memory 33, and communication unit 34.

The CPU 31 controls operations of various components in the image processing unit 12, The CPU 31 may be a single processor or may include multiple processors. The CPU 31 executes various programs loaded from the nonvolatile memory 33 into the RAM 32. These programs include an operating system (OS) and various application programs.

The application program includes an image processing program 32A. The image processing program 32A includes instructions for estimating a relationship of camera positions at the time of capturing, by using images obtained by capturing an object so as to estimate a position of the object. The RAM 32 is a storage medium used as a main storage device. The nonvolatile memory 33 is a storage medium used as an auxiliary storage device.

The communication unit 34 is a device configured to execute wire communication or wireless communication. The communication unit 34 includes a transmitter that transmits a signal and a receiver that receives a signal. The communication unit 34 executes; for example, communication with an external device over a network, and communication with an external device on the periphery. An example of the external device includes the image capture unit 11 (image capture apparatus). Therefore, the communication unit 34 may receive an image from the image capture unit 11.

FIG. 9 illustrates a functional structure of the image processing program 32A executed by the CPU 31 of the image processing unit 12. The image processing program 32A includes a buffer processing module 41, a feature detection module 42, a corresponding point detection module 43, a three-dimensional coordinate calculation module 44, a blur correction amount calculation module 45, a distance calculation module 46, a correction amount calculation module 47, and a correction module 48. Operations of each module can be realized as the CPU 31 executes the instructions included in the image processing program 32A.

The buffer processing module 41 obtains an image captured by the image capture unit 11 by data transmission through the communication unit 34, and stores the obtained image in a frame buffer 40. The frame buffer 40 is, for example, a storage area allocated in the RAM 32. The buffer processing module 41 stores at least two images in the frame buffer 40. These at least two images are different from each other, being generated by capturing the object at least at different positions or different viewpoints. It is to be noted that these at least two images may also be referred to as images captured at different positions and/or postures of the camera with respect to the object at the time of capturing.

More specifically, the buffer processing module 41 receives a first image 401 from the image capture unit 11, and stores the first image 401 in the frame buffer 40. The buffer processing module 41 then receives a second image 402 from the image capture unit 11, and stores the second image 402 in the frame buffer 40. The first image 401 and the second image 402 are obtained by a single optical system included in the image capture unit 11.

The feature detection module 42 detects features from each of the images 401 and 402 stored in the frame buffer 40. The feature detection module 42 detects the features such as edges or corners on the images 401 and 402, using local feature amounts on the images. As for the feature amounts, ORB, SIFT, SURF, KAZB, AKAZS, or the like may be used.

The corresponding point detection module 43 matches the features on the first image 401 and the features on the second image 402 so as to detect corresponding points that correspond between these images 401 and 402. In other words, the corresponding point detection module 43 detects a second feature on the second image 402 that corresponds to a first feature on the first image 401 so as to detect a corresponding point including the first feature and the second feature. Therefore, the detected corresponding point indicates that a pixel (the first feature) at a certain position on the first image 401 corresponds to a pixel (the second feature) at a certain position on the second image 402. It should be noted that the corresponding point detection module 43 may detect a corresponding point in a sub-pixel unit. The matching is performed based on the feature amount of each feature, for example, by a round-robin method, a fast approximate nearest neighbor method or the like.

The three-dimensional coordinate calculation module 44 calculates three-dimensional coordinates of the object on a relative scale, for example, by the SAM using the first image 401 and the second image 402. The three-dimensional coordinates of the object on the relative scale is, for example, the three-dimensional coordinates having the indeterminate scale parameter α related to the object. Specifically, the three-dimensional coordinate calculation module 44 calculates a relative positional relationship between the image capture unit 11 (camera) at the time of capturing the first image 401 and the image capture unit 11 at the time of capturing the second image 402, and calculates three-dimensional information of the object having the indeterminate scale parameter β based on the corresponding points between the first image 401 and the second image 402.

The relative positional relationship of the image capture unit 11 at the time of capturing each of the two images 401 and 402 is represented, for example, by a relative positional relationship between two camera coordinate systems. A relative positional relationship between a first camera coordinate system set for the camera at the time of capturing the first image 401 and a second camera coordinate system set for the camera at the time of capturing the second image 402 is represented by one or more parameters: for example, the rotation matrix R and the translation vector t. The first camera coordinate system is set based on a posture of the camera, centering on a position of the camera at the time of capturing the first image 401. The second camera coordinate system is set based on a posture of the camera, centering on a position of the camera at the time of capturing the second image 402. The scale of the translation vector t is indeterminate (unknown).

The three-dimensional coordinate calculation module 44 calculates the rotation matrix R and the translation vector t based on an epipolar constraint condition which indicates a geometric relationship of the corresponding points. As for this calculation, for example, an eight-point algorithm is used. When the relative positional relationship between the first camera coordinate system and the second camera coordinate system (for example, the rotation matrix R and the translation vector t) is calculated, the three-dimensional coordinate calculation module 44 can calculate the three-dimensional coordinate having the unknown scale parameter β for each corresponding point based on principles of stereo vision (triangulation). With the scale parameter β, the three-dimensional coordinates can be corrected to the three-dimensional coordinates on an absolute scale (on the real scale).

Furthermore, the blur correction amount calculation module 45 and the distance calculation module 46 calculate the distance to the object based on blurs on the images.

First, the blur correction amount calculation module 45 calculates a first blur correction amount for correcting a blur on a first wavelength component image included in the first image 401 to a blur on a second wavelength component image included in the first image 401. The blur correction amount calculation module 45 also calculates a second blur correction amount for correcting a blur on a third wavelength component image included in the second mace 402 to a blur on a fourth wavelength component image included in the second image 402.

At least one of a blur function of the first wavelength component image and a blur function of the second wavelength component image is point-asymmetric. At least one of a blur function of the third wavelength component image and a blur function of the fourth wavelength component image is point-asymmetric. The first wavelength component image and the third wavelength component image have a wavelength band similar to each other or partially overlapping each other, examples of which are R and B images. The second wavelength component image and the fourth wavelength component image have a wavelength band similar to each other or partially overlapping each other, an example of which is a G image.

The blur correction amount calculation module 45 calculates, for example, a blur correction amount for each corresponding point between the first image 401 and the second image 402. A blur correction amount at a position (x, y) on an image is expressed by the following function.

$$r(x,y)$$

It should be noted that the position (x, y) on the image indicates a physical distance based on the center of the image. This function indicates that the blur correction amount at the position (x, y) on the image is determined by the position (x, y) on the image as an input.

The distance calculation module 46 calculates at least one of a first distance to the object in the first image 401 and a second distance to the object in the second image 402 by using the correction parameter α for correcting at least one of influences caused by ambient light, a reflection characteristic of the object, or a color of the object. Specifically, the distance calculation module 46 calculates the first distance to the object in the first camera coordinate system based on the first blur correction amount. The distance calculation module 46 also calculates the second distance to the object in the second camera coordinate system based on the second blur correction amount. The calculated distance includes the correction parameter α for correcting at least one of influences caused by the ambient light, the reflection characteristic of the object, or the color of the object. Since the influences caused by the ambient light, the reflection characteristic or the color of the object differ for each three-dimensional position of the object, the correction parameter α may differ for each position (x, y) on the image. Therefore, the distance to the object at the position (x, y) on the image is expressed by the following function.

$$Z(r(x,y),\alpha(x,y))$$

This function indicates that the distance to the object at the position (x, y) on the image is determined by the blur correction amount r (x, y) at the position (x, y) on the image and by the correction parameter α (x, y) as inputs.

Next, the correction amount calculation module 47 calculates the correction parameter α and the scale parameter β based on at least one of the first distance and the second distance calculated by the distance calculation module 46 and based on the three-dimensional coordinates on the relative scale (the three-dimensional coordinates having the indeterminate scale parameter β) calculated by the three-dimensional coordinate calculation module 44. The correction amount calculation module 47 optimizes so that the three-dimensional coordinates having unknown scale information and at least one of the first distance and the second distance indicate the same real-space position, thereby calculating the correction parameter α and the scale parameter β. Hereinafter described is a method for calculating the correction parameter α and the scale parameter β.

The three-dimensional coordinates corresponding to the position (x, y) on the image are expressed by the following equation (1) based on the distance calculated by the distance calculation module 46.

$$O_{D/D}(x,y,\alpha(x,y))=(x,y,z) \times Z(r(x,y),\alpha(x,y))/z \quad \text{equation (1)}$$

It should be noted that z represents a distance between the lens 22 and the image sensor 23 and is generally determined in advance by camera calibration. In other words, with the position (x, y) on the image, and the distance information at that position (the blur correction amount r (x, y) and correction parameter α (x, y)), the equation indicates that the three-dimensional coordinates corresponding to the position (x, y) on the image are calculated.

FIG. 10 illustrates a case where a position 821 on the first image 401 and a position 841 on the second image 402 of a certain corresponding point are (x1, y1) and (x2, y2), respectively. Three-dimensional coordinates of an object point 851 corresponding to this corresponding point can be expressed with two coordinate systems: the first camera coordinate system centering on a camera position 81 at the time of capturing the first image 401, and the second camera coordinate system centering on a camera position 83 at the time of capturing the second image 402. First three-dimensional coordinates of the object point 851 based on the first distance in the first camera coordinate system and second three-dimensional coordinates of the object point 851 based on the second distance in the second camera coordinate system are expressed by the following function.

$$O_{D/D}(x_1,y_1,\alpha(x_1,y_1))$$

$$O_{D/D}(x_2,y_2,\alpha(x_2,y_2))$$

On the other hand, third three-dimensional coordinates of the object point 851 in the first camera coordinate system and fourth three-dimensional coordinates of the point 851 in the second camera coordinate system are expressed by the following function when these coordinates are expressed based on the three-dimensional coordinates having the unknown scale information calculated by the three-dimensional coordinate calculation module 44.

$$O_{SfM}(x_1,y_1,\beta)$$

$$O_{SfM}(x_2,y_2,\beta)=R^{-1}(O_{SfM}(x_1,y_1,\beta)-\beta t)$$

In each of the first camera coordinate system and the second camera coordinate system, conditions to make the three-dimensional coordinates of the object point 851 using the distance calculated by the distance calculation module 46 match with the three-dimensional coordinates of the object point 851 using the three-dimensional coordinates having the unknown scale calculated by the three-dimensional coordinate calculation module 44 are expressed by the following two relational expressions (equations (2) and (3)).

$$O_{D/D}(x_1,y_1\alpha(x_1,y_1))=O_{SfM}(x_1,y_1,\beta) \quad \text{equation (2)}$$

$$O_{D/D}(x_2,u_2,\alpha(x_2,y_2))=O_{SfM}(x_2,y_2,\beta) \quad \text{equation (3)}$$

The correction amount calculation module 47 calculates the correction parameter α and the scale parameter β so that the equations (2) and (3) hold at the same time. For example, as equations (2) and (3) are solved simultaneously, the correction parameter α and the scale parameter β are calculated for each corresponding point. Since the two equations are set up for two unknown quantities α and β, the correction amount calculation module 47 can optimize the correction parameter α and the scale parameter β for each object point (corresponding point).

The correction parameter α takes a common value between features (pixels) included in a certain corresponding point. In other words, the correction parameter α takes a common value between images in regard to a certain corresponding point. However, the value of the correction parameter α may differ for each corresponding point (object point). It is natural that the scale parameter β takes a common value regardless of corresponding points.

Therefore, the correction amount calculation module 47 may optimize the correction parameter α and the scale parameter β so as that the equation (2) and equation (3) hold for each corresponding point under such a constraint condition that the scale parameter β takes a common value regardless of corresponding points. For example, an error function including errors on both sides of equation (2) and errors on both sides of equation (3) is defined, and a cost function that is a sum of error functions for each corresponding point (a cost function of minimum square error criterion) is defined. The correction amount calculation module 47 calculates the correction parameter α and the scale parameter β so as to minimize the cost function under such a constraint condition that the scale parameter β takes a common value. For this calculation, for example, a gradient method, one of algorithms for searching a solution of an optimization problem, is used.

The case where the correction parameter α is optimized for each corresponding point has been described above, but the correction parameter α may be optimized so that the correction parameter α takes a common value for each area in consideration of disturbance influences such as noise at the time of capturing. For example, it is estimated that an influence of ambient light or a reflection characteristic of an object is substantially similar in a local area around a corresponding point or an area having a similar color on an image (for example, an area having a pixel value within a threshold) so that it is estimated that the correction parameter α also takes the same or a similar value. In such an area, the correction amount calculation module 47 may optimize the correction parameter α and the scale parameter β so that the equation (2) and equation (3) hold for each area under such a constraint condition that the correction parameter α takes a common value in each area and that the scale parameter β takes a common value regardless of areas. Alternatively, the correction amount calculation module 47 may optimize the correction parameter α and the scale parameter β so that the equation (2) or the equation (3) holds for each area under the constraint condition.

In a case where the reflection characteristic of the object is uniform, it is sufficient to correct the influence of ambient light so that it is natural that the value of the correction parameter α takes a common value regardless of corresponding points. In this case, the correction amount calculation module 47 calculates the correction parameter α that is common for pixels on the first image 401 and pixels on the second image 402.

In this manner, the correction parameter α can be optimized for each corresponding point, for each area, or for pixels on an image.

The correction module 48 calculates the three-dimensional coordinates (three-dimensional information) of the object on the real scale based on at least one of the first distance and the second distance, and the three-dimensional coordinates having the indeterminate scale. For this calculation, the correction parameter α and the scale parameter β calculated by the correction amount calculation module 47 can be used. The correction module 48 may calculate the three-dimensional coordinates of the object on the real scale based on the three-dimensional coordinates having the indeterminate scale and the scale parameter β, or based on the correction parameter α and the first blur correction amount or the second blur correction amount. The three-dimensional coordinates can be expressed in two ways by using the first camera coordinate system or the second camera coordinate system so that the correction module 48 may calculate the three-dimensional coordinates, using both of them, or one of them which is necessary.

With low accuracy of the three-dimensional coordinates having the indeterminate scale parameter β calculated by the three-dimensional coordinate calculation module 44, for example, with small movement of the object between the two images 401 and 402, it should be noted that the correction module 48 may calculate the three-dimensional coordinates of the object based on the first distance or the second distance calculated by the distance calculation module 46.

The correction module 48 outputs the three-dimensional information (may be a range image) including the three-dimensional coordinates on the real scale. The three-dimensional information to be output can be appropriately changed to an embodiment corresponding to an application that employs the ranging apparatus 1. For example, in a case of determining a three-dimensional shape of an object, the three-dimensional coordinates in the first camera coordinate system may be output or the three-dimensional coordinates in the second camera coordinate system may be output. Furthermore, for example, in a case where the ranging apparatus 1 is mounted on a movable body such as a car or a rover and where distance information to an object is to be determined in real time, it is desirable to output three-dimensional coordinates in a camera coordinate system that corresponds to an image having the latest time stamp.

Still further, in a case of outputting information on a camera position, the correction module 48 may also output information including the rotation matrix R and the translation vector t. Still further, the correction module 48 may also calculate a self-position and a self-posture of the ranging apparatus 1 (image capture unit 11) in a certain coordinate system, using the rotation matrix R and the translation vector t, so as to output information including the self-position and self-posture. The self-position is represented by, for example, three-dimensional coordinates in any local coordinate system. The self-position may also be represented by three-dimensional coordinates of a world coordinate system or coordinates of latitude and longitude. The self-posture may be represented by, for example, yaw, roll, pitch, or a quaternion.

Hereinafter, exemplary procedures executed by the image processing unit 12 will be described with reference to the flowchart in FIG. 11. As described above, these procedures can be executed as the CPU 31 of the image processing unit 12 executes the instructions included in the image processing program 32A.

First, the buffer processing module 41 obtains images captured by the image capture unit 11, and stores the images in the frame buffer 40 (step S11). Herein, illustrated is a case where the first image 401 and the second image 402 are stored in the frame buffer 40. Each of the images 401 and 402 includes two or more image components corresponding to two or more wavelength bands (color components), including, for example, R, G, and B images.

The feature detection module 42 detects features from each of the images 401 and 402 stored in the frame buffer 40 (step S12). The corresponding point detection module 43 matches the features detected from the first image 401 and the features detected from the second image 402 so as to detect corresponding points that correspond between the images (step S13).

The three-dimensional coordinate calculation module 44 estimates three-dimensional information of the object 210 having an indeterminate scale, using the corresponding points between the images (step S14). The three-dimensional coordinate calculation module 44 estimates movement (camera motion) of the image capture unit 11 by the SfM, using the corresponding points. More specifically, the three-dimensional coordinate calculation module 44 estimates the movement of the image capture unit 11 from a first position and posture (first viewpoint) at the time of capturing the first image 401 to a second position and posture (second viewpoint) at the time of capturing the second image 402 based on the estimated movement so as to relatively estimate the first position, the second position, and the posture at each position. The three-dimensional coordinate calculation module 44 then estimates three-dimensional coordinates of the object 210 corresponding to each corresponding point, by using the first position, the second position, and the posture at each position.

The blur correction amount calculation module 45 calculates blur correction information of the object, by using at least one of the first image 401 and the second image 402 (step S15). The blur correction information includes a first blur correction amount regarding the first image 401 and a second blur correction amount regarding the second image 402.

The distance calculation module 46 calculates distance information to the object based on the blur correction information (step S16). Specifically, the distance calculation module 46 calculates first distance information to the object in the first camera coordinate system based on the first blur correction amount, and calculates second distance information to the object in the second camera coordinate system based on the second blur correction amount. As described above, the distance information includes the correction parameter α for correcting at least one of influences caused by the ambient light, the reflection characteristic of the object, or the color of the object.

The correction amount calculation module 47 calculates the correction parameter α and scale parameter β, by using the three-dimensional information having the unknown scale estimated in step S14 and the first distance information and/or the second distance information calculated in step S16 (step S17). The correction amount calculation module 47 optimizes so that the three-dimensional information having the unknown scale and distance information (first distance information, second distance information) indicate the same real-space position, thereby calculating the correction parameter α and the scale parameter β.

The correction module 48 corrects the three-dimensional information having the unknown scale, using the scale parameter β, so as to calculate the three-dimensional information on the real scale (step S18). The correction module 48 may calculate the three-dimensional information on the real scale, using the correction parameter α and the first blur correction amount or the second blur correction amount. Alternatively, instead of the three-dimensional information on the real scale, the range image on the real scale may be calculated. The correction module 48 outputs the calculated three-dimensional information (or the range image) on the real scale (step S19).

In such manners, the image processing unit 12 is capable of calculating the three-dimensional information of the object 210 on the real scale with high accuracy. The procedure in step S14 and the procedures in step S15 and step S16 can be executed in parallel.

As described above, according to this embodiment, it is possible to obtain a position of an object from images with high accuracy. The frame buffer 40 stores the first image 401 including the object and the second image 402 different from the first image 401 including the object. The distance calculation module 46 calculates at least one of the first distance to the object in the first image 401 and the second distance to the object in the second image 402, using the correction parameter α for correcting at least one of influences caused by the ambient light, the reflection characteristic of the object, or the color of the object. The three-dimensional coordinate calculation module 44 calculates the three-dimensional coordinates of the object on the relative scale by using the first image 401 and the second image 402. The correction amount calculation module 47 and the correction module 48 calculate the three-dimensional coordinates of the object on the real scale based on at least one of the first distance and the second distance and based on the three-dimensional coordinates on the relative scale. Accordingly, the three-dimensional coordinates indicating the position of the object can be obtained with high accuracy from the first image 401 and the second image 402.

(Example of Application)

Hereinafter described are some examples to which the ranging apparatus 1 having the aforementioned structure is applied.

Figure 12:
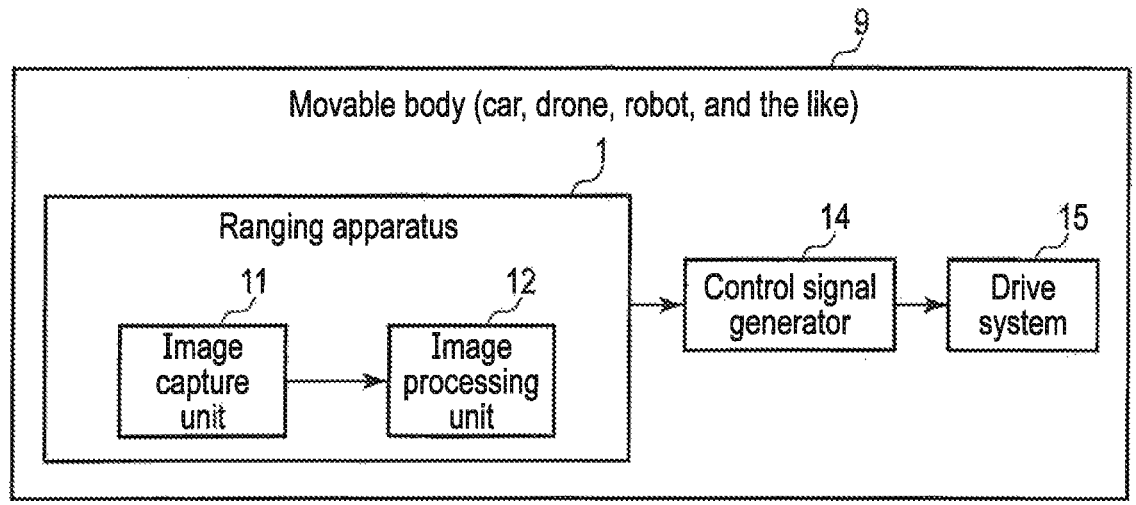
FIG. 12 is a block diagram illustrating a structure of a movable body including the ranging apparatus of the embodiment.

FIG. 12 illustrates an exemplary functional structure of a movable body 9 including the ranging apparatus 1. The movable body 9 can be realized, for example, as a car having a self-driving function, an unmanned aerial vehicle, and an autonomous mobile robot. Examples of the unmanned aerial vehicle include an airplane, a rotary wing aircraft, a glider, or an airship that a person cannot board. The unmanned aerial vehicle can fly by remote control or on autopilot, and examples thereof include a drone (multicopter), a radio control plane, and a helicopter for spraying agricultural chemicals. An example of the autonomous mobile robot includes a mobile robot such as an automated guided vehicle (AGV), a cleaning robot used for floor cleaning, and a communication robot that provides various kinds of information to visitors. In addition to the examples in which the robot itself moves, the movable body 9 may also be an industrial robot having a drive system for moving and rotating a part of the robot such as a robot arm.

As illustrated in FIG. 12, the movable body 9 includes, for example, the ranging apparatus 1, a control signal generator 14, and a drive system 15. Among the components disposed in the ranging apparatus 1, at least the image capture unit 11 is installed, for example, so as to capture an object in a traveling direction of the movable body 9 or a part thereof.

Figure 13:
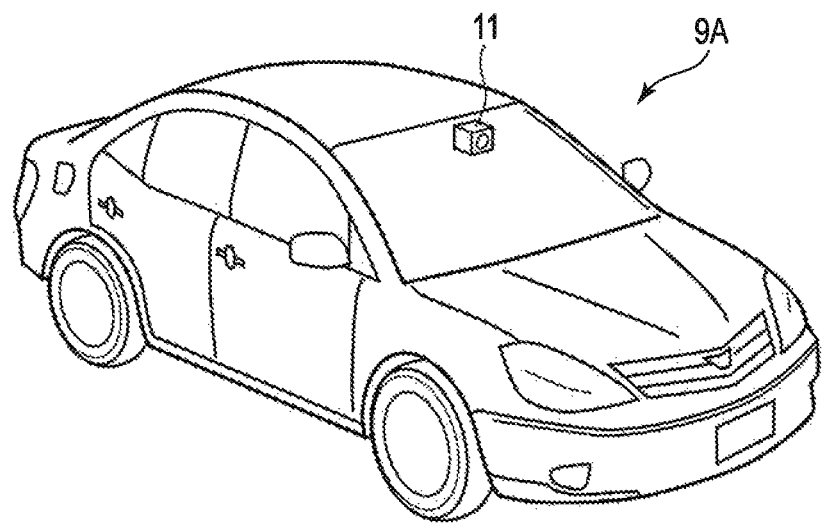
FIG. 13 is a perspective view illustrating an exemplary external appearance of a car including the ranging apparatus of the embodiment.

In a case where the movable body 9 is a car 9A as illustrated in FIG. 13, the image capture unit 11 may be installed as what is called a front camera that captures an image in front of the movable body 9, or as what is called a rear camera that captures an image in back of the movable body 9 when backing. It is a matter of course that both of those cameras may be installed. The image capture unit 11 may double as what is called a drive recorder. In other words, the image capture unit 11 may be a video recorder.

Figure 14:
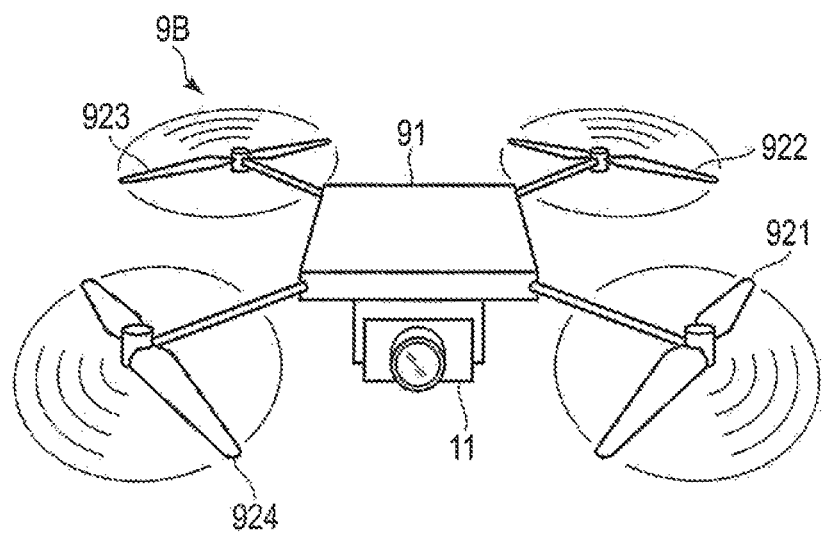
FIG. 14 is a perspective view illustrating an exemplary external appearance of a drone including the ranging apparatus of the embodiment.

FIG. 14 illustrates another example in a case where the movable body 9 is a drone 9B. The drone 9B includes a drone body 91 corresponding to the drive system 15 and four propeller units 921, 922, 923, and 924. Each of the propeller units 921, 922, 923, and 924 includes a propeller and a motor. Transmitting drive of the motor to the propeller rotates the propeller, and the drone 9B floats due to lifting force caused by the rotation. The image capture unit 11 (or the ranging apparatus 1 including the image capture unit 11) is mounted on, for example, a lower part of the drone body 91.

Figure 15:
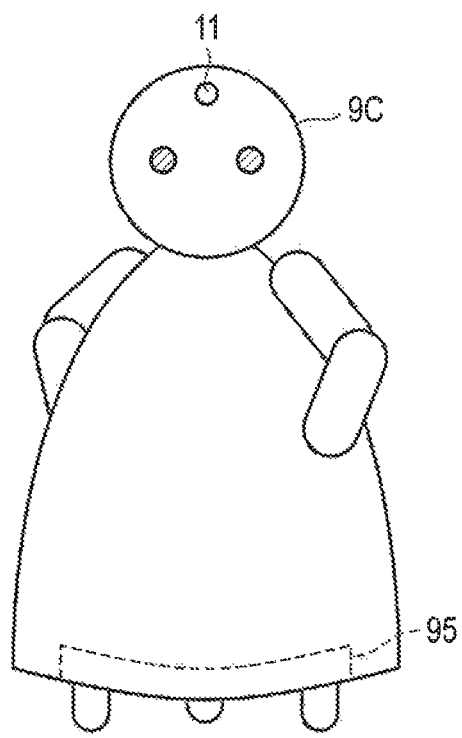
FIG. 15 is a perspective view illustrating an exemplary external appearance of a robot including the ranging apparatus of the embodiment.

FIG. 15 illustrates another example in a case where the movable body 9 is an autonomous mobile robot 9C. A power output unit 95 including a motor, wheels, and the like, corresponding to the drive system 15 is provided to a lower part of the mobile robot 9C. The power output unit 95 controls rotation frequency of the motor and postures of the wheels. Transmitting drive of the motor to the wheels rotates the wheels in contact with a road surface or a floor surface. As the postures of the wheels are controlled, the mobile robot 9C can move in any direction. The image capture unit 11 may be installed, for example, on the head of the humanoid mobile robot 9C so as to capture an image in front of the mobile robot 9C. It should be noted that the image capture unit 11 may be installed so as to capture an image in back of, or right/left side of the mobile robot 9C. Alternatively, the image capture unit 11 may be installed in plural so as to capture images in multiple directions. Furthermore, a small robot having less space for mounting a sensor and the like may be provided with at least the image capture unit 11 so as to estimate a self-position, a self-posture, and a position of an object, thereby performing dead reckoning.

In a case of controlling movement and rotation of a part of the movable body 9, the image capture unit 11 may be installed at a leading end and the like of a robot arm SD, as illustrated in FIG. 16, so as to capture an object held by the robot arm 9D. The image processing unit 12 estimates a three-dimensional shape of an object which is to be held and a position where the object is placed. Accordingly, the robot arm 9D can perform an accurate operation to hold the object.

The control signal generator 14 outputs a control signal to control the drive system 15 based on the self-position, the self-posture, and the position of the object output from the ranging apparatus 1. The drive system 15 drives the movable body 9 or a part of the movable body 9 by the control signal. The drive system 15 performs, for example, at least one of the following operations: operations to move, rotate, accelerate, or decelerate the movable body 9 or a part thereof, an operation to increase or decrease thrust (lifting force) of the movable body 9 or a part thereof, an operation to change a traveling direction, an operation to switch between a normal operation mode and an automatic operation mode (collision avoidance mode), or an operation to activate a safety device such as an air bag. In a case where a distance from the self-position to the object is less than a threshold, the drive system 15 may perform, for example, at least one of the following operations: operations to move, rotate, accelerate, increase or decrease thrust (lifting force), an operation to change directions so as to face a direction in which the movable body 9 approaches an object, or an operation to switch from the automatic operation mode (collision avoidance mode) to the normal operation mode.

The drive system 15 of the car 9A is, for example, a tire. The drive system 15 of the drone 9B is, for example, a propeller. The drive system 15 of the mobile robot 9C is, for example, leg units. The drive system 15 of the robot arm 9D is, for example, a support unit that supports the leading end provided with the image capture unit 11.

The movable body 9 may further include a speaker or a display in which information relating to the self-position, self-posture, and position of the object from the image processing unit 12 is input. The speaker and the display output sounds or images relating to the self-position, the self-posture, and the position of the object. The speaker and the display are connected to the ranging apparatus 1 through wire or wirelessly. The movable body 9 may also include a light emitting unit in which the information relating to the self-position, self-posture, and position of the object from the image processing unit 12 is input. The light emitting unit is configured to, for example, turn on or off a light in accordance with the information relating to the self-position, self-posture, and position of the object from the image processing unit 12.

It should be noted that the image processing unit 12 of the ranging apparatus 1 may use an estimated position of the image capture unit 11 and a map created by a device other than the ranging apparatus 1 and input to the ranging apparatus 1 (for example, a map for car navigation) so as to estimate the position of the image capture unit 11 on the map. The movable body 9 may be provided with a GPS receiver (not illustrated) to receive GPS signals and to detect a position in a GPS coordinate system. The map for car navigation is, for example, a map used in a car navigation system provided to a car, including data that indicates objects such as roads, bridges, and buildings obtained based on the GPS coordinate system. The position obtained with the GPS receiver may include an error (for example, an error by several meters) depending on situations at the time of obtaining the GPS signals. Therefore, not only the position obtained with the GPS receiver but also the position of the image capture unit 11 estimated by the ranging apparatus 1 are used so that the self-position on the map can be estimated with higher accuracy. Even in a case where the position cannot be obtained with the GPS receiver due to poor reception of the GPS signals, once the self-position on the map is obtained, then, the image processing unit 12 can continuously estimate the self-position on the map, using the position of the image capture unit 11 continuously estimated by the ranging apparatus 1. Accordingly, it is possible to move the movable body 9 to a target position.

The image processing unit 12 may also complement the map for car navigation, using three-dimensional coordinates of estimated features (that is, three-dimensional coordinates of a captured object on pixels on an image). For example, the image processing unit 12 can repeatedly estimate three-dimensional coordinates of features from captured images continuously obtained while the car is traveling. Accordingly, three-dimensional coordinates of an object not included in the map for car navigation can be added to the map so that a more detailed map can be obtained. Based on the position of the image capture unit 11 on the complemented map, the control signal generator 14 and the drive system 15 can move the movable body 9 (a car, and the like) so as to avoid, for example, a collision.

As another example, in a case where the movable body 9 is a drone, when generating a map (a three-dimensional shape of an object), investigating a structure of a building or terrain, or checking cracks or breakage in an electric wire from the sky, the image capture unit 11 obtains an image of an object and determines whether a distance between a self-position and an object is equal to or more than a threshold. Based on the determination result, the control signal generator 14 generates a control signal for controlling thrust of the drone so that the distance to the object to be inspected is kept constant. Herein, the thrust also includes lifting force. As the drive system 15 operates the drone based on this control signal, the drone can fly in parallel to the object to be inspected. In a case where the movable body 9 is a monitoring drone, a control signal for controlling thrust of the drone may be generated so that a distance to an object to be monitored is kept constant.

When the drones fly, the image capture unit 11 obtains an image shot in a direction toward the ground and determines whether a distance between a self-position and the ground is equal to or more than a threshold. Based on the determination result, the control signal generator 14 generates a control signal for controlling the thrust of the drone so that a height from the ground is set to a specified height. As the drive system 15 operates the drone based on this control signal, the drone can fly at the specified height. In a case where the movable body 9 is a drone for spraying agricultural chemicals, an agricultural chemical can be spread evenly as a height of the drone from the ground is kept constant.

In a case where the movable body 9 is a drone or a car, when drones fly in concert with each other or when cars drive in a row, the image capture unit 11 obtains images shot of surrounding drones or an image of a car in front of the movable body 9, and determines whether distances from a self-position to the surrounding drones or a distance to the foregoing car is equal to or more than a threshold. Based on the determination result, the control signal generator 14 generates a control signal for controlling thrust of the drone or a speed of the car so that the distances to the surrounding drones or the distance to the foregoing car is kept constant. As the drive system 15 operates the drone or the car based on this control signal, the drone can easily fly in concert with other drones or the car can easily drive in a row with other cars. In a case where the movable body 9 is a car, a threshold may be changed as the movable body 9 receives an instruction from a driver through a user interface so that the driver can set the threshold. Accordingly, the driver can drive the car while keeping his/her preferred inter-vehicular distance. Alternatively, in order to maintain a safe inter-vehicular distance to a foregoing car, a threshold may be changed in accordance with the speed of the car. The safe inter-vehicular distance varies depending on the speed of the car. The more the speed of the car increases, the longer the threshold is set. In the case where the movable body 9 is a car, a predetermined distance in a traveling direction is preferably set as a threshold, and the control signal generator 14 is preferably configured to automatically operate a brake or a safety device such as an air bag when an object appears in front of the threshold, in this case, the safety device such as an automatic brake or an air bag is provided to the drive system 15.

In such manners, according to this embodiment, it is possible to obtain a position of an object on the real scale with high accuracy, and by using the position of the object on the real scale, it is possible to easily control operations of the movable body 9 of various types such as a car, a drone, and a robot.

Each of the various functions described in this embodiment may be realized by a circuit (processing circuit). An example of the processing circuit includes a programmed processor such as a central processing unit (CPU). This processor executes computer programs (instructions) stored in a memory so as to execute each of the described functions. The processor may be a microprocessor including an electrical circuit. Examples of the processing circuit include a digital signal processor (DSP), an application specific integrated circuit (ASIC), a microcontroller, a controller, and other electrical circuit components. Each of the components other than the CPU described in this embodiment may also be realized by the processing circuit.

Furthermore, the various procedures in this embodiment can be realized by computer programs. Therefore, as the computer programs are installed in a computer through a storage medium capable of reading the computer storing the computer programs, it is possible to achieve effects similar to those in this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a buffer configured to store a first image capturing an object and a second image capturing the object, the first image being different from the second image, the first image and the second image being captured by an image capturing device; and
    processing circuitry configured to:
    calculate at least one of a first distance to the object in the first image and a second distance to the object in the second image, the first and second distances each including a correction parameter for correcting at least one of influences caused by ambient light, a reflection characteristic of the object, or a color of the object;
    calculate three-dimensional coordinates of the object on a relative scale by using only the first image and the second image;
    calculate the correction parameter and a scale parameter for converting the three-dimensional coordinates on the relative scale into three-dimensional coordinates on a real scale so that at least one of the first distance and the second distance, and the three-dimensional coordinates of the object on the relative scale indicate a same position in a real space; and
    calculate the three-dimensional coordinates of the object on the real scale by using the calculated correction parameter and the calculated scale parameter.

2. The image processing apparatus of claim 1, wherein the processing circuitry is configured to calculate the three-dimensional coordinates of the object on the real scale based on the calculated scale parameter and the three-dimensional coordinates on the relative scale.

3. The image processing apparatus of claim 1,
    wherein the first image comprises a first wavelength component image and a second wavelength component image,
    the second image comprises a third wavelength component image and a fourth wavelength component image,
    the processing circuitry is further configured to:
        calculate a first blur correction amount used for correcting a blur included in the first wavelength component image to a blur included in the second wavelength component image;
        calculate a second blur correction amount used for correcting a blur included in the third wavelength component image to a blur included in the fourth wavelength component image;
        calculate the first distance based on the first blur correction amount; and
        calculate the second distance based on the second blur correction amount.

4. The image processing apparatus of claim 3, wherein:
    at least one of the blur included in the first wavelength component image and the blur included in the second wavelength component image has a point-asymmetric shape, and
    at least one of the blur included in the third wavelength component image and the blur included in the fourth wavelength component image has a point-asymmetric shape.

5. The image processing apparatus of claim 3, wherein the processing circuitry is configured to:
    calculate the correction parameter and a scale parameter that is used for converting the three-dimensional coordinates on the relative scale into the three-dimensional coordinates on the real scale by using at least one of the first distance and the second distance, and the three-dimensional coordinates on the relative scale; and
    calculate the three-dimensional coordinates of the object on the real scale based on the calculated correction parameter and the first blur correction amount or based on the calculated correction parameter and the second blur correction amount.

6. The image processing apparatus of claim 5, wherein the processing circuitry is configured to calculate the correction parameter for each corresponding point between the first image and the second image.

7. The image processing apparatus of claim 5, wherein the processing circuitry is configured to calculate the correction parameter for each area having a similar color on the first image or the second image.

8. The image processing apparatus of claim 5, wherein the processing circuitry is configured to calculate the correction parameter common in pixels of the first image and pixels of the second image.

9. The image processing apparatus of claim 1, wherein the processing circuitry is further configured to calculate one or more parameters indicative of a relative positional relationship between a position and posture at which the first image is captured and a position and posture at which the second image is captured.

10. The image processing apparatus of claim 1, wherein distance information to the object at a time of capturing is encoded in each of the first image and the second image.

11. The image processing apparatus of claim 1, wherein the first image and the second image are both obtained by an optical system.

12. A ranging apparatus comprising:
    an image processing apparatus comprising:
    a buffer configured to store a first image capturing an object and a second image capturing the object, the first image different from the second image; and
    a processing circuitry configured to:
    calculate at least one of a first distance to the object in the first image and a second distance to the object in the second image, the first and second distances each including a correction parameter for correcting at least one of influences caused by ambient light, a reflection characteristic of the object, or a color of the object;
    calculate three-dimensional coordinates of the object on a relative scale by using only the first image and the second image;

calculate the correction parameter and a scale parameter for converting the three-dimensional coordinates on the relative scale into three-dimensional coordinates on a real scale so that at least one of the first distance and the second distance, and the three-dimensional coordinates of the object on the relative scale indicate a same position in a real space; and calculate the three-dimensional coordinates of the object on the real scale by using the calculated correction parameter and the calculated scale parameter;

an image capturing device configured to capture the first image and the second image.

13. The ranging apparatus of claim 12, wherein the image capturing device comprises:

a lens;

an image sensor comprising at least two types of imaging elements configured to receive light rays having different wavelength bands; and a filter provided on an optical path of light rays penetrating the lens and entering the image sensor, comprising at least two filter areas which transmit light rays having different wavelength bands.

\* \* \* \* \*